Dec. 21, 1948.   W. L. HANSEN ET AL   2,456,701
SPEED CONTROL MECHANISM FOR ELECTRIC MOTORS
Filed July 18, 1945   2 Sheets-Sheet 2
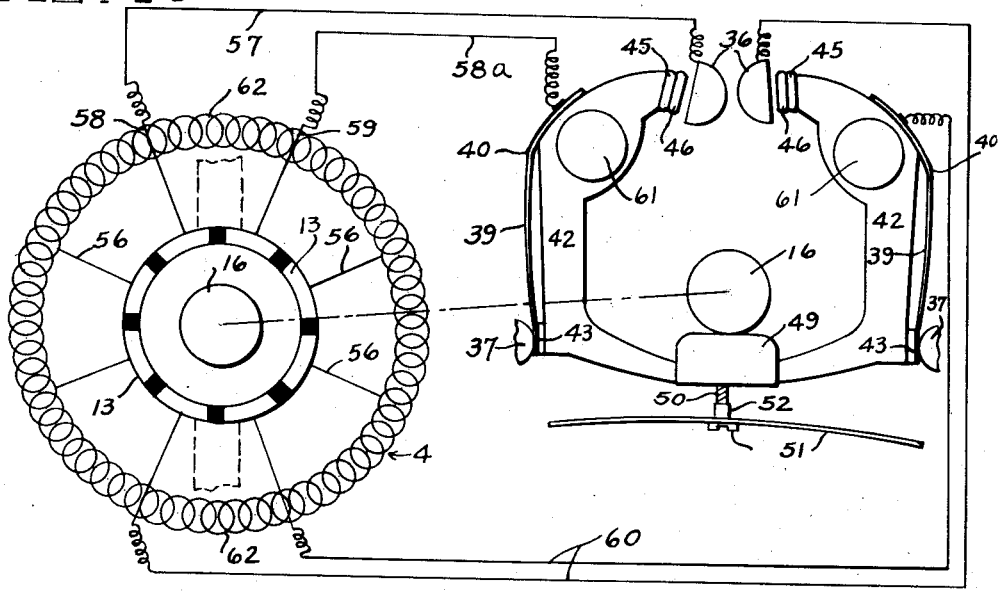
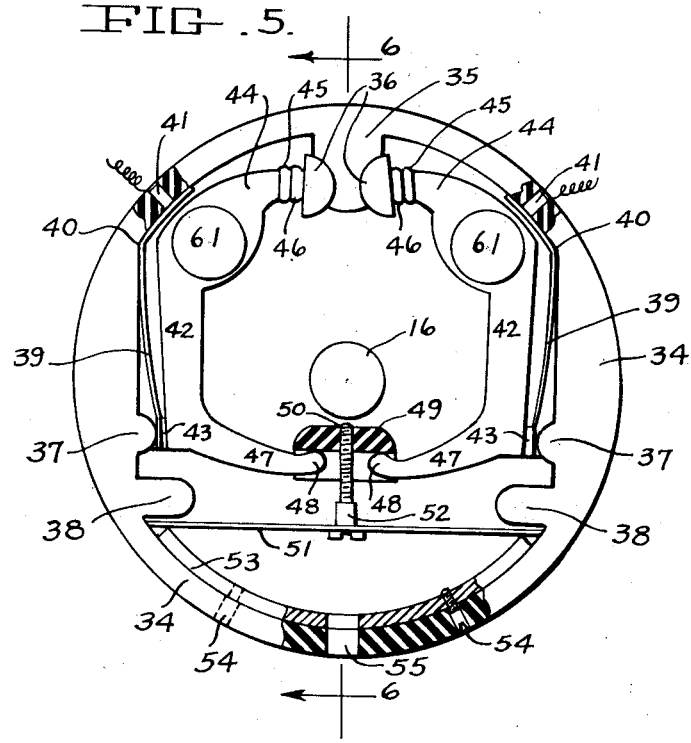
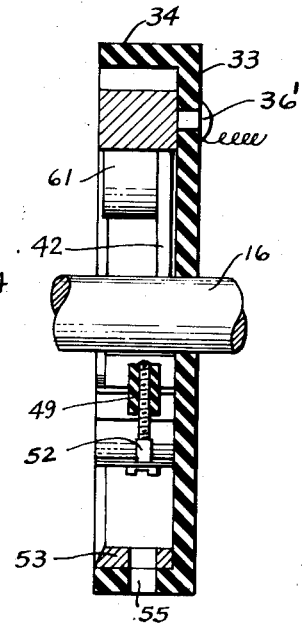
INVENTORS
WILLIAM L. HANSEN
IRA N. HURST
BY
Toulmin & Toulmin
ATTORNEY Patented Dec. 21, 1948

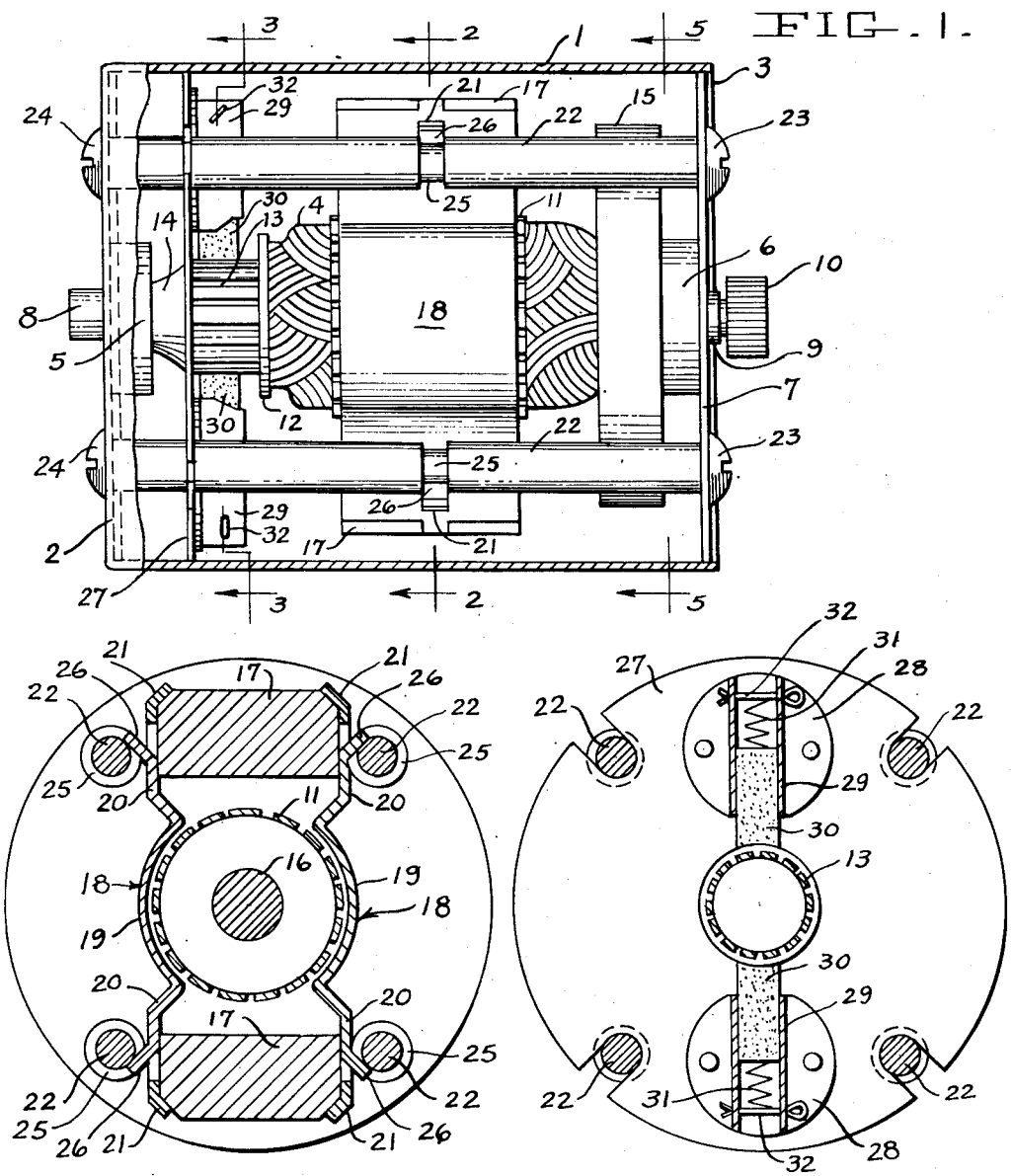

2,456,701

UNITED STATES PATENT OFFICE 2,456,701

SPEED CONTROL MECHANISM FOR ELECTRIC MOTORS

William L. Hansen and Ira N. Hurst, Princeton, Ind., assignors to The Hansen Manufacturing Company, Inc., Princeton, Ind., a corporation of Indiana Application July 18, 1945, Serial No. 605,776

7 Claims. (Cl. 172—36)

1

The present invention relates to electric motors of small or fractional horsepower type and more especially to a simplified and inexpensive construction for such motors.

This application is a continuation-in-part of our prior application Serial No. 547,714, Hansen and Hurst, filed August 2, 1944, and entitled "Speed control mechanism for electric motors."

Electric motors are used at the present extensively for control purposes in place of levers and connecting rods, in order to simplify the control mechanism, and to introduce dependability of operation. In certain types of installations, such as airplane accessories and operating mechanism, control motors, are located in remote and often inaccessible positions throughout the airplane and due to the large numbers of motors employed per plane, such motors must be relatively inexpensive, of a sturdy design and absolutely dependable in operation.

Another condition which must be met in installations of this character is that of constancy of speed, regardless of line voltage fluctuation or sudden change in the load. In the case of an airplane, such motors usually run from storage batteries which are in various states of charge and discharge and considerable variations in the load may be present due to changes in the mechanical conditions within and atmospheric conditions without the airplane.

The primary object of the invention is to provide an electric motor of efficient but inexpensive design which lends itself to quantity production, and also to the procurement of a high degree of constancy of speed regardless of changes of applied voltage and load. This object is obtained in brief by providing a field formed of fixed magnets and mounting the magnets within straps detachably carried upon a set of rods. The motor assembly terminates at one end in a flat nonmetallic plate to which brush holders can be readily secured, and the armature at the other end of the motor is adapted to receive a speed control governor of an improved design.

The invention will be better understood when reference is made to the following description and the accompanying drawings in which:

Figure 1 represents an elevational view of the motor but broken away for the most part to expose the internal construction.

Figure 2 is a vertical sectional view taken along line 2—2 in Figure 1.

Figure 3 is a vertical section taken along line 3—3 in Figure 1.

Figure 4 is a schematic view of the armature

2 circuit of the motor together with the improved speed control governor and showing the electrical connections between the various elements of the motor and the governor.

Figure 5 is a vertical sectional view taken along line 5—5 in Figure 1.

Figure 6 is a sectional view cutting across the diametral portion of the speed governor device as indicated by the line 6—6 in Fig. 5, but leaving the central shaft in elevation.

Referring more particularly to Figures 1 to 3, reference character 1 designates a nonmagnetic metal casing, preferably polished on its exterior surface. The casing is provided with an integrally formed bottom member 2 but is open at the other end as indicated at 3. This casing contains all of the elements of the improved motor and the speed control device. The armature 4 of the motor is carried on a pair of stationary bearings 5, 6, the bearing 5 being secured in any suitable manner to the bottom plate 2. The bearing 6 is secured to a plate or disc 7 of insulating material having a diameter such that it fits snugly within the interior surface of the casing 1. The bearings 5, 6 are preferably of the ball bearing type to minimize friction and the shaft 8 of the armature extends through the bearing 5 to the exterior of the casing. At the opposite end of the armature, a shaft 9 extends through the ball bearing 6 and through the disc 7 for receiving a small gear or pinion 10 keyed thereto.

The armature proper of the motor is of the wound type including laminations 11 which constitute the armature core and through which the windings are threaded in the usual manner. A disc 12 of insulating material rests against one end of the armature windings and to the left of the disc as seen in Fig. 1 there is the usual form of commutator 13. A curved conically shaped portion 14 extends from the end of the commutator and is received within the ball bearing 5 to connect with the projecting portions of the shaft 8.

At the opposite end, the armature terminates in a flat surface against which rests a speed control device 15 which is illustrated in Figs. 4, 5 and 6. This device is secured to the armature shaft 16 in any suitable manner, this shaft passing through the ball bearing 6 and forming the extension 7 on which the pinion 10 is mounted. Thus, the armature 4 is adapted to rotate between the ball bearings 5, 6 and to perform work at the pinion 10. The field of the motor is constituted of fixed magnets 17 having a length as measured along the longitudinal axis of the motor comparable to the length of the laminations 11. The magnets may be formed of Alnico or other highly magnetized metal and are positioned at a suitable distance away from the armature, on opposite sides thereof, by means of a pair of metal straps generally indicated at 18. These straps of non-magnetic material have a circular portion 19 so as to leave sufficient clearance for the armature laminations as shown in Fig. 2 and terminate at each end in a shallow dished-out portion 20 which receives the end surfaces of the magnets. At a position approximately midway of the width of each strap portion 20, there is a tongue 21 pressed out of the metal which fits into a small slot in each magnet so as to prevent the latter from moving along the width of the strap. The straps are secured in position by four metal rods 22 extending lengthwise of the casing and affixed at one end of the disc 7 by means of screws 23, and at the other end, to the bottom 2 of the casing by screws 24. The rods 22 are provided with a turned-down portion 25 at a position approximately midway of the length of each rod.

A short piece 26 is struck out of the metal of each strap, the struck-out portions being adapted to abut the turned-down grooves 25 of the immediately adjacent shaft so that the tongue 26 which enters the groove, in effect, serves to prevent the straps from moving lengthwise of the rods 22. In addition, these tongues function to press the straps against the fixed magnets 17, and thus hold them in position. It is therefore seen that there is no soldering, welding or other undetachable joints employed for positioning the magnets 17 within the casing 1 but this positioning effect is obtained solely by the use of the shouldered rods 22 and the tongue portions 26 which fit against the shouldered portions of the shaft and the tongue portions 21 which fit against and clamp about the fixed magnets.

There is a disc 27 of insulating material extending across the casing 1 and positioned directly to the left of the commutator 13 as seen in Fig. 1. This material carries a pair of metal discs 28 on which is mounted a rectangularly shaped metal brush holder 29 containing carbon brushes 30. These brushes at their inner ends bear against the commutator segments and are urged into this position by means of a compression spring 31 which abuts a cotter pin 32 extending through the brush holder.

Suitable electrical connections are taken from the armature 4 to the commutator bars as indicated in Fig. 4 and power is supplied to the commutator through the brushes 30. When the armature is energized in this manner, the field set up by the armature windings will react with the magnetic field of the fixed magnets 17 to cause the armature to rotate at a speed depending on the voltage of the current thus supplied.

It has been found that in the usual type of motors, particularly those of very small or fractional horse power size, it is quite difficult to maintain a constant speed of the armature for a given constant voltage because the slightest change in the load applied at the pinion 10 causes an appreciable change in the speed of the motor. Again, even slight variations in the voltage of the current applied to the armature will normally cause considerable variations in speed. These conditions represent a difficult problem, particularly in aircraft control mechanism where changes in position in the flying control parts of the plane must operate at the precise moment and at a very carefully regulated speed. Moreover, the voltage applied to the motor is subject to variations in aircraft control mechanisms since this voltage is often dependent upon storage batteries which are not always maintained fully charged or on occasion are overcharged so that it becomes very important in certain uses of these small motors to provide constant speed regardless of temporary overloads and temporary variations in voltage. The construction of the motor as described hereinbefore lends itsself unusually well to the use of the speed control device 15 since such device may be readily interposed between the armature 4 and the inner flat surface of the ball bearing casing 6. This speed control mechanism has been disclosed and claimed in our earlier application referred to hereinbefore of which the present application constitutes a continuation-in-part. In order that the present disclosure shall be complete, it is considered necessary and desirable to describe the operation of the speed control device which is illustrated in Figures 4, 5 and 6.

Referring more particularly to Figs. 4, 5 and 6, reference character 33 refers to a circular plate of insulating material having a flanged edge 34. There is a projection 35 extending inwardly and radially from the outside rim which serves as a support for a pair of stationary contacts 36. These contacts may have a spherical head which sets snugly in an opening within the projection 35 and is riveted as indicated at 36' to the plate 33. In addition to the projection 35, there are two other projections or knobs 37, 38 extending from opposite sides of the casing 34 and transversely of the casing. The projections 37 form abutments for spring elements 39 which are bent at 40 and secured to the inner surface of the flange 34 by rivets 41.

A pair of V-shaped arms or levers 42 are secured in each corner 43 to the lower ends of the springs 39 at the position of the projections 37. Each lever is provided with a finger 44 which terminates in a bent-up portion 45 for receiving a contact button 46. The levers 42 at the lower ends are also provided with a pair of inwardly extending legs 47 which have rounded ends 48. These ends are received by a slotted groove formed on the underside of the clamping block 49 of insulating material which is provided with a tapped hole 50. A spring plate 51 of metal spans the distance between the underside surfaces of the projections 38 and a screw 52 effectively secures the block 49 to the metal strip 51. An arcuate band of metal 53 extends around the lower inner surface of the flange 34 and is of sufficient length to hold the strip 51 firmly against the underside of the projections 38. The strip may be secured to the flange 34 by a pair of screws 54. An opening 55 is provided in the flange 34 and the metal band 53 to permit the insertion of a screwdriver to the head of the screw 52. The strip 53 is firmly held in position by the projections 38 and the arcuate member 53, and any tightening of the screw 52 within the block 49 causes the legs 47 to move downwardly about the fulcrums formed of the knobs 37 and thus cause the contact pieces 46 to press against the adjacent contacts 36.

Each lever is suspended from the flange 34 of the casing by the spring 39 which tends to press the legs inwardly so that when the screw 52 is loosened, the legs 47 are also caused to move upwardly, resulting in the separation of the contacts. The screw 52 therefore effectively serves to regulate the pressure at the contacts 46 and 36. The pressure regulating effect of the spring piece 51 is shown in Fig. 4 wherein it will be noted that there is a space existing between the two pairs of contacts at each side of the switch.

The switch as a whole is mounted on the motor shaft 16, shown in Figs. 2 and 5, with the flange portion 34 directed toward the armature windings 4. Connections 56 are taken from suitable taps on the windings 4 and to their respective commutator segments 13. A conductor 57 is connected between the stationary contact 36 and a tap 58 on the armature windings while a conductor 58a extends between the spring 39 and another tap 59 on the windings. Conductors 60 may also be taken from separate taps on opposite sides of the armature winding and the stationary contact 36 and spring 39 at the other side of the switch.

It is apparent that as the motor shaft 16 rotates faster than a predetermined speed due to any cause, for example, a temporary increase in the line voltage applied to the armature windings or a temporary reduction in the load applied to the motor shaft, the increased centrifugal effect acting on the levers 42 overcome the flexing effects at the spring 51 and cause the levers to swing about the springs 39 to open the contacts at the terminals 36 and 46 at each side of the switch. In order to increase the extent of this outward movement, and therefore the separation of the contacts by reason of centrifugal effect, we may attach cylindrical weights 61 to the levers 42. This action open circuits the oppositely disposed armature coils which, under certain circumstances, has the effect of reducing the speed of the motor. When the speed slackens, the levers 42 swing in the opposite direction about the spring members 39 to close the contacts 36 and 46, to reinsert the armature coils 62. It is apparent that by adjusting the screw 52, the point in the speed characteristic of the motor in which the two levers of the switch will kick-in or out will be closely regulated in order to obtain absolute constancy of motor speed, regardless of fluctuations in the line voltage or changes in the shaft load. The absence of pivots on the levers 42 which normally give rise to friction also tends to increase the sensitivity of the regulator.

From the foregoing, it is evident that we have disclosed a relatively inexpensive form of fractional horse power motor together with an improved device for controlling the speed thereof so that the structure as a whole lends itself to those operating conditions, commonly found in airplane control mechanism which require the use of many motors of an inexpensive character but of a sturdy and completely dependable design. The entire motor and speed regulating device are completely enclosed within the casing 1 and its cover 7 so as to be free from dust, oil, etc., and yet the interior of the casing can be readily made accessible by simply loosening the screws 23 and removing the disc 7. The ball bearing 6 is preferably secured to the disc 7 so that removal of the disc will permit an immediate inspection of the speed control device and the fixed magnets 17. If it is desired to remove the entire armature for checking the condition of the commutator or the brushes, this can also be accomplished by simply removing the screws 23 and the disc 7 at which time the entire armature can be slipped from under the straps 18. The magnets 17 and their strap carriers can be readily removed by loosening all of the screws 23, 24 which will permit the rods 22 to be slipped out of place, carrying with them the straps 18. In the matter of assembly, the various parts are also easily fitted together as no tools are required other than a screwdriver by which to manipulate the screws 23, 24. The magnets 17 and their strap support 18 can be inexpensively made so that the structure as a whole lends itself to quantity production and assembly methods, utilizing the minimum number of parts of inexpensive construction.

It will be understood that we desire to comprehend within our invention such modifications as come within the scope of the claims.

Having thus fully described our invention, what we claim as new and desire to secure by Letters Patent, is:

1. An electric motor comprising an armature and field member, said field member including a permanent magnet having a pole face adjacent the armature, a plurality of rods extending lengthwise of the armature, and a pair of oppositely disposed non-magnetic straps spanning said rods and adapted to supportably receive the permanent magnet between them.

2. An electric motor comprising an armature, and a field formed of two oppositely disposed permanent magnets with their pole faces laying adjacent the armature, a plurality of rods extending lengthwise of the armature, and a pair of oppositely disposed non-magnetic straps positioned on opposite sides of the armature and adapted to supportably receive the permanent magnets between them, said straps being detachably secured to said rods.

3. An electric motor comprising an armature and a field member formed of a plurality of permanent magnets presented to opposite sides of the armature, a plurality of rods extending lengthwise of the armature and a plurality of oppositely disposed straps spanning the rods and adapted to receive the permanent magnets between them, said rods being grooved at a position intermediate the length of the armature, and a tongue formed on each of said straps which engages the groove in order to position the straps along the length of the rods.

4. An electric motor comprising an armature and a field composed of at least one permanent magnet, a plurality of rods extending lengthwise of the armature, and a pair of oppositely disposed straps spanning the rods and adapted to receive said permanent magnet between them, and means for detachably securing the straps to the permanent magnet.

5. An electric motor comprising an armature and a field composed of at least one permanent magnet, a plurality of rods extending lengthwise of the armature, and a pair of oppositely disposed straps spanning the rods and adapted to receive said permanent magnet between them, and means for detachably securing the straps to the permanent magnet, said means including integral projections provided on the straps which hook over the end edge of the magnet.

6. An electric motor comprising a casing closed at both ends, a plurality of rods secured to opposite ends of the casing, a combined armature-commutator element journalled at each end in the casing, a pair of field magnets on opposite sides of the armature, straps of non-magnetic material for clamping and positioning the magnets within the casing, and means for detachably securing the straps to said rods.

7. An electric motor comprising a casing closed at both ends, a plurality of rods secured to opposite ends of the casing, a combined armature-commutator element journalled at each end in the casing, a pair of field magnets on opposite sides of the armature, straps for positioning the magnets within the casing, said straps including tongues formed thereon which are received by grooves formed in said rods, and means including an integral tongue formed at the ends of the straps and which hook over the magnets for detachably securing the magnets in position.

WILLIAM L. HANSEN.
IRA N. HURST.

REFERENCES CITED

The following references are of record in the file of this patent:

UNITED STATES PATENTS

| Number | Name | Date |
|---|---|---|
| 10,175 | Carpenter | Nov. 1, 1853 |
| 58,960 | Berlioz | Oct. 16, 1866 |
| 2,170,892 | Cox | Aug. 29, 1939 |